INVENTORS
HENRY S. MIILLER
ROBERT J. LINHARDT &
ROBERT D. SIONAM
BY Carl V. Olson
ATTORNEY Aug. 19, 1969 H. S. MIILLER ETAL 3,462,742

COMPUTER SYSTEM ADAPTED TO BE CONSTRUCTED OF LARGE INTEGRATED CIRCUIT ARRAYS

Filed Dec. 21, 1966 3 Sheets-Sheet 2

INVENTORS
HENRY S. MIILLER,
ROBERT J. LINHARDT &
ROBERT D. SIDNAM

BY Carl V. Olson
Attorney

INVENTORS
HENRY S. MIILLER
ROBERT J. LINHARDT &
ROBERT D. SIDNAM

BY Carl V. Olson
ATTORNEY

United States Patent Office 3,462,742

Patented Aug. 19, 1969

3,462,742

COMPUTER SYSTEM ADAPTED TO BE CONSTRUCTED OF LARGE INTEGRATED CIRCUIT ARRAYS

Henry S. Miller, Yardley, Pa., and Robert J. Linhardt, Moorestown, and Robert D. Sidnam, Cinaminson, N.J., assignors to RCA Corporation, a corporation of Delaware Filed Dec. 21, 1966, Ser. No. 603,635

Int. Cl. G11b *13/00*

U.S. Cl. 340—172.5 17 Claims

ABSTRACT OF THE DISCLOSURE

A general-purpose computer system is disclosed which is particularly adapted to be constructed of a plurality of large integrated circuit arrays. The computer system consists of partitioned parts which are interconnected by means of system buses. Each partitioned part of the computer system includes registers for storing information. The term "information" is meant to include instructions, commands, addresses, status and data. Each partitioned part also includes means for controlling information transfers between its registers and the system buses. Each partitioned part further includes processor or control means responsive to the contents of at least one of its registers to accomplish a manipulation of the contents of at least one of its registers. Each partitioned unit is preferably fabricated in the form of a single integrated circuit array.

CROSS REFERENCES

An application Ser. No. 432,774, entitled, "Computer System," filed on Feb. 15, 1965, by Saul Y. Levy and assigned to the present assignee, describes a computer system characterized in that a large proportion of the system can be constructed of similar or "regular" circuit units.

BACKGROUND OF THE INVENTION

A general-purpose computer includes a memory for storing instructions and data, and a central processor for interpreting the instructions and accomplishing the instructed processing of the data. The path in the computer through which the instructions and data pass consist of conductors, gates and flip-flops which are "regular" or similar throughout the computer. On the other hand, the paths in the computer through which the control signals go in accomplishing the instructed processing of the data are extremely complex, varied and irregular.

Prior computer systems have been constructed of individual component circuits or gates and have been organized to employ a minimum total number of such circuits. Now it is possible to fabricate an array of a large number (such as 100 or 200) of interconnected circuits or gates as a single unit known as an integrated circuit array. A "large" integrated circuit array is one having over 50 gates. Such an array of circuits has peripheral terminals for connection with other arrays and buses in constructing a system. The physical size of an array is such that there is space around the periphery of the array for up to about 100 to 120 terminals. As improvements are made increasing the number of useable circuits or gates that can be included in the array, the length of the periphery available for terminals remains about the same. Arrays of 100, 200, 300 or 400 gates all have peripheral space for not more than about 100 or 120 terminals. The usefulness in computer systems of large integrated circuit arrays then depends on a partitioning of the computer system into parts that involve a sufficiently small terminal-to-gate ratio, i.e., a sufficiently large gate-to-terminal ratio.

A computer system as conventionally organized cannot be partitioned into parts each including a large number (such as 200) of gates without exceeding the permissible number (such as 100) of peripheral terminals. A conventional computer organization involves so many control conductors that a 200-gate partitioned part of the computer will normally require more than 100 wires going to and from the 200 gates.

BRIEF SUMMARY OF THE INVENTION

According to an example of the invention, a computer system (including a memory unit, an address manipulation unit, an arithmetic unit, an input-output unit and a master control unit) is organized to be made up of partitioned parts all connected with system buses. Each partitioned part includes (1) registers for storage of instructions, commands, addresses, or data, (2) gates for connecting the registers with the system buses, (3) a recognizer connected with the system bus for controlling the register-bus gates, and (4) a local processor or controller responsive to the contents of a register to accomplish a manipulation of the contents of a register.

DETAILED DESCRIPTION OF DRAWING

Figure 1:
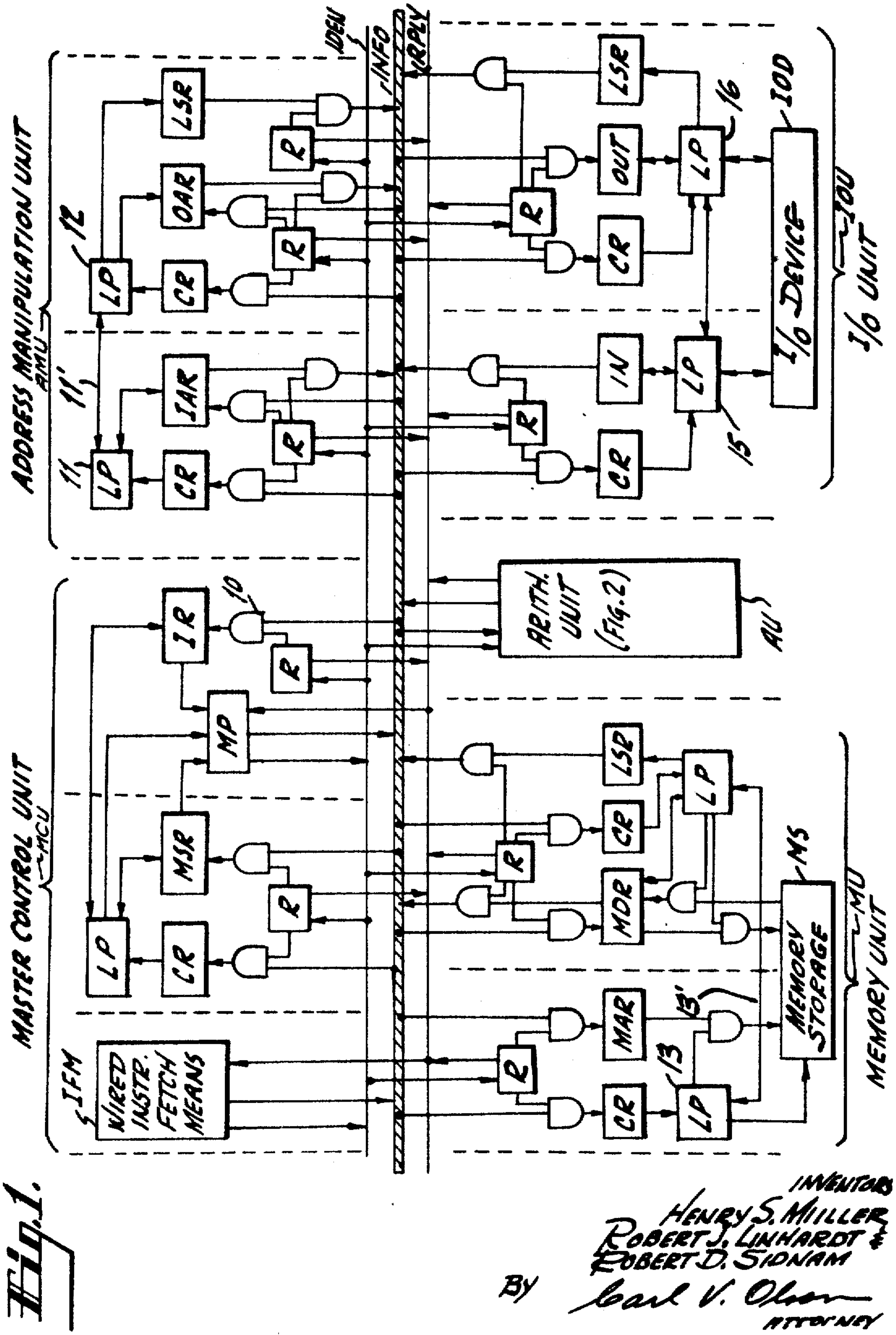
FIG. 1 is a diagram of a general-purpose computer system constructed according to the teachings of this invention.

Reference is now made in greater detail to FIG. 1 in which there is shown a computer system including an identification bus IDEN, an information bus INFO and a reply bus RPLY. A number of units connected to the buses are identified as: a master control unit MCU, an address manipulation unit AMU, a memory unit MU, an arithmetic unit AU and an input-output unit IOU.

Each of the listed units includes registers having names appropriate to the functions for which the registers are employed. For example, the master control unit MCU includes an instruction register IR, the address manipulation unit AMU includes an instruction address register IAR and an operand address register OAR, the memory unit MU includes a memory address register MAR and a memory data register MDR, the input-output unit IOU includes a data input register IN and a data output register OUT, and the arithmetic unit includes (in FIG. 2) an operand A register OPA, an operand B register OPB and an accumulator register ACC. Each of the listed registers includes means such as flip-flops for the storage of a large number of information bits. The information bus INFO includes a large number of conductors for a corresponding number of information bits. A number of information bits can simultaneously be transferred between a listed register and the information bus INFO through controllable gates. For example, the symbol 10 represents a plurality of simultaneously controllable gates for transferring a plurality of information bits from the information bus INFO to the instruction register IR.

In addition to the above listed registers, each unit in the system of FIG. 1 includes at least one command register CR and includes a status register designated a master status register MSR in the master control unit MCU and designated local status register LSR in the remaining units. These additional command registers and status registers are similarly provided with gates for the controllable transfer of information bits between the register and the information bus INFO. Information transfers between the information bus and the registers may be in one direction, the other direction, or both directions, depending on the purpose of the individual register.

All the gates permitting transfers of information between the information bus INFO and a register are under the control a register-direction recognizer R. Each recognizer R is connected to receive signals on the multiconductor register-direction identification bus IDEN. Each recognizer R has an output or outputs connected to enable gates to permit a transfer of information between the information bus INFO and a recognized register in a recognized direction. Stated another way, a register-direction identifying signal present on the identification bus IDEN is recognized by one of the recognizers R and it enables appropriate gates to permit the transfer of information to or from the identified register. Each recognizer also has an output connected to the reply bus RPLY to signal the completion of an information transfer.

Each of the units shown in FIG. 1 includes at least one local processor LP connected to a corresponding command register CR in the respective unit. The local processors LP in the various units each respond to the contents of a respective command register CR and provide control outputs operative to manipulate the contents of other registers in the respective unit. Unlike a single central processor in a conventional computer, the local processors LP distributed among the units in the system of FIG. 1 are relatively simple and capable of performing only the limited type of processing required in connection with the contents of the nearby registers. For example, the local processors LP at 11 and 12 in the address manipulation unit are required to accomplish incrementing, decrementing and other relatively simple manipulations on the contents of the address registers IAR and OAR and the local status register LSR. In the memory unit MU, the local processors LP at 13 and 14 are merely required to control the storage or retrieval of information from memory storage device MS, and simple operations concerned with parity generation and checking and status recording. In the input-output unit IOU the local processors LP at 15 and 16 are required to simply control the buffering operations involved in transferring information between the input-output device IOD and the computer system.

The master control unit MCU differs from other units shown in FIG. 1 in that, in addition to having a local processor LP, it also has a master processor MP. The master processor MP is relatively more complex since its primary task is the interpretation of the contents of the instruction register IR and the generation and application of appropriate signals to the buses IDEN and INFO for the purpose of identifying source and destination registers anywhere in the computer system and for issuing commands for transfer to identified command registers CR throughout the computer system. The operation of the master processor MP in utilizing the contents of the instruction register IR is conditioned also on inputs from the local processor LP and the master status register MSR. The master processor also has an input from the reply bus RPLY by which it is informed that a unit elsewhere in the system has completed an identified information transfer.

A wired instruction fetch means IFM may be viewed as a part of the master control unit MCU. The instruction fetch means IFM has outputs connected to the identfication bus IDEN and the information bus INFO, and has an input from the reply bus RPLY. The wired instruction fetch means performs a function necessary in all general purpose computers, the function being the utilization of the contents of the instruction address register IAR to effect the transfer of the identified instruction from memory storage MS to the instruction register IR. The master control unit MCU then utilizes the contents of the instruction register IR and controls the computer in the execution of the instruction, which may include the successive execution of a plurality of elementary operations, and the incrementing or conditional modification of the contents of the instruction address register IAR. Thereafter, the wired instruction fetch means IFM uses the new contents of the instruction address register IAR to access and transfer the next instruction to the instruction register IR.

Figure 2:
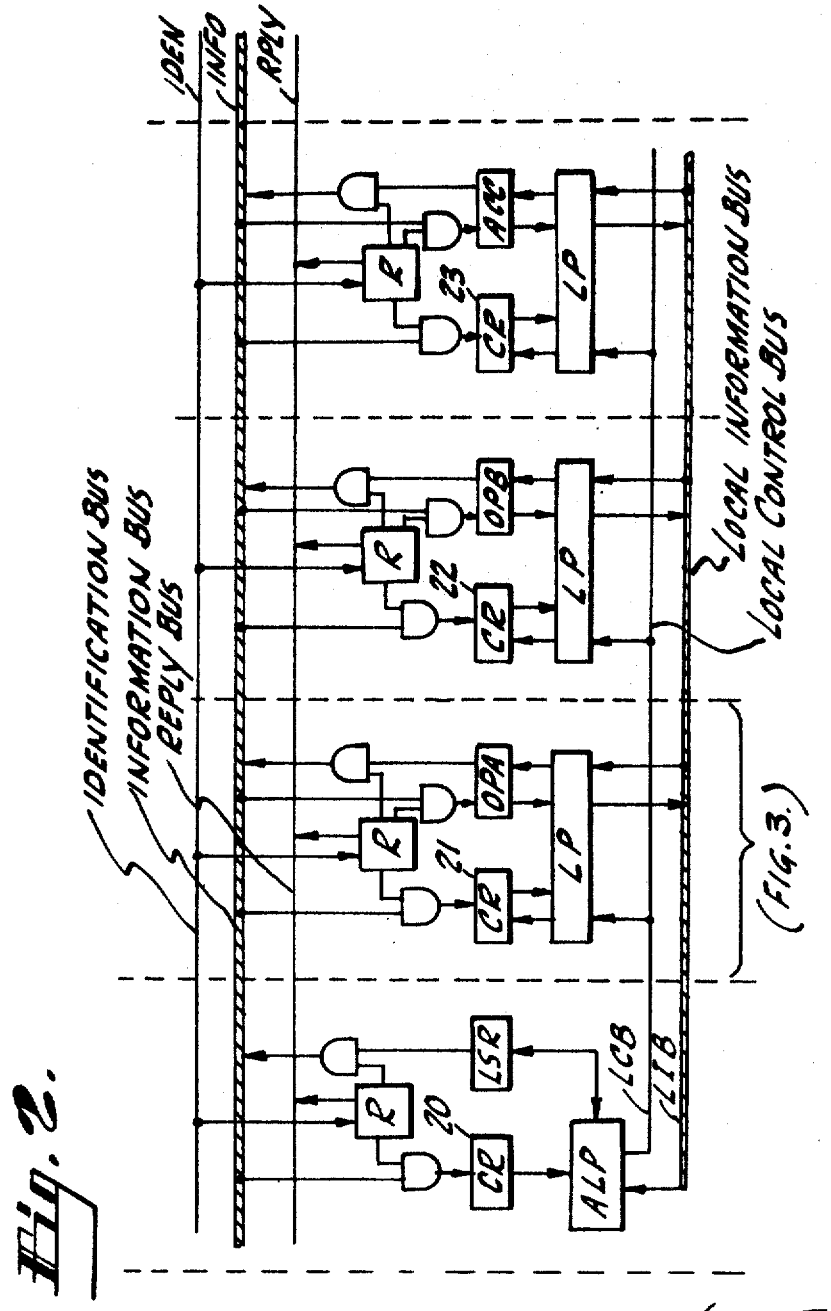
FIG. 2 is a diagram of the arithmetic unit shown as a box in FIG. 1.
Figure 3:
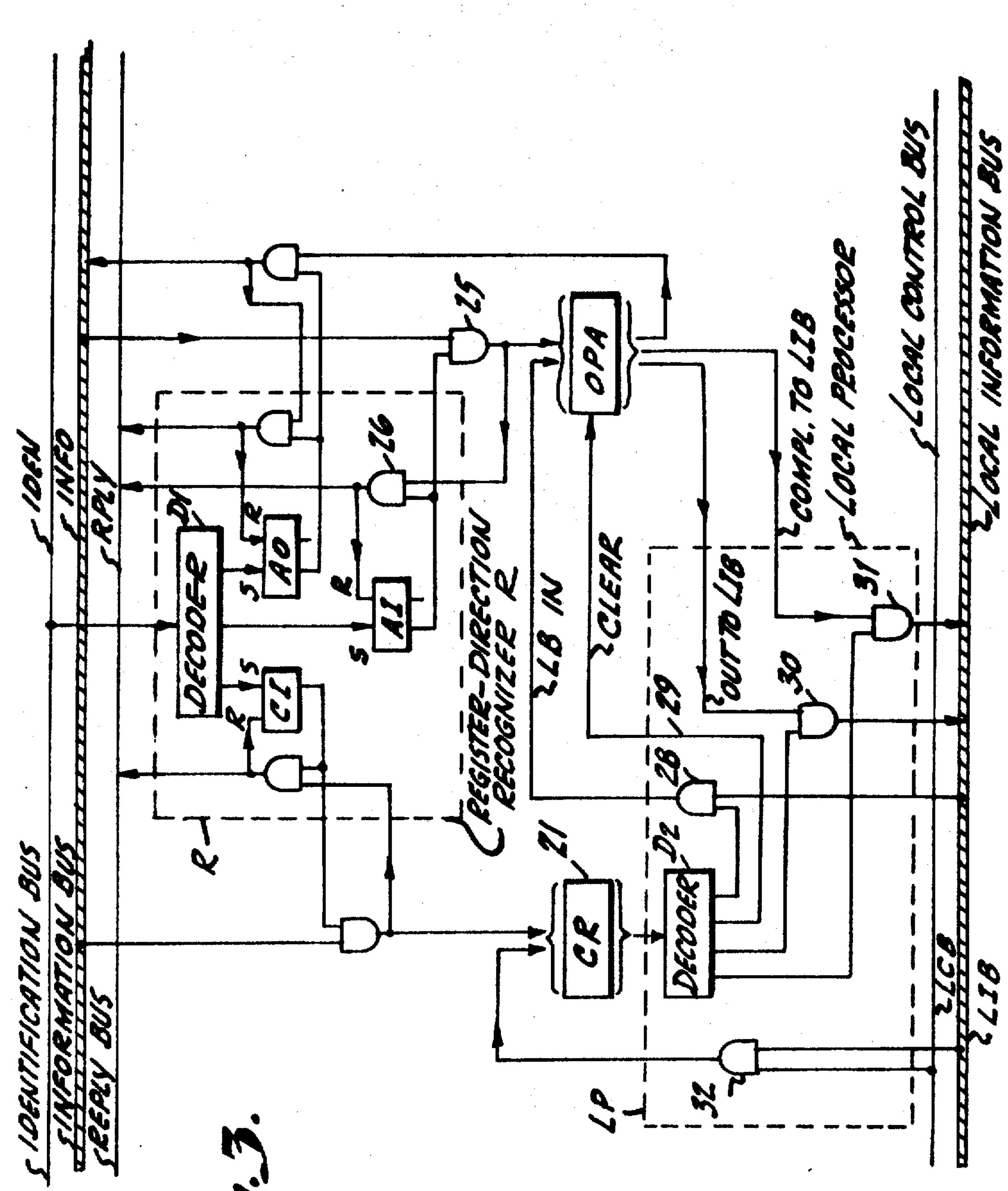
FIG. 3 is a diagram showing a portion of the arithmetic unit of FIG. 2 in greater detail.

Reference is now made to FIGS. 2 and 3 for a description of the arithmetic unit AU which may constitute about sixty percent of the hardware of the entire computer system. The arithmetic unit is shown in FIG. 2 to include a local status register LSR, an operand A register OPA, an operand B register OPB and an accumulator register ACC. Each of the listed registers has associated with it a respective command register CR. A plurality of register-direction recognizers R are provided for controlling transfers from the information bus INFO to the command register CR, and for controlling transfers between the other registers and the information bus INFO. The recognizers R operate in response to register-direction indicating signals received from the identification bus IDEN. The recognizers R supply a signal or signals to the reply bus RPLY when an information transfer is accomplished.

The contents of the command register CR designated 20 in FIG. 2 is supplied to and utilized by an arithmetic local processor ALP. The contents of the other command registers CR designated 21, 22, 23 in FIG. 2 are supplied to respective local processors LP. The arithmetic local processor ALP and the local processors LP are interconnected by a local control bus LCB and a local information bus LIB.

The arithmetic local processor ALP in FIG. 2 controls the execution of arithmetic operations such as add, subtract, multiply, divide, and the like. The arithmetic local processor may be constituted by an integrated-circuit read-only memory containing sequences of elementary operations to be performed in accomplishing the respective arithmetic operations such as add, subtract, etc. Each elementary operation stored includes the address in the read-only memory of the next elementary operation in the particular sequence. The first elementary operation of the sequence, such as the add sequence, is initiated by a transfer from the master control unit MCU through the information bus INFO to the command register 20 in FIG. 2 of the address in the read-only memory in the arithmetic local processor ALP of the first elementary operation of the sequence. In the execution of the necessary elementary operations, the arithmetic local processor ALP manipulates the contents of the operand and accumulator registers, OPA, OPB and ACC through the local buses and the respective local processors LP.

Reference is now made to FIG. 3 for a description in greater detail of the labeled portion of FIG. 2 which includes the operand A register OPA. The register-direction recognizer R is shown in FIG. 3 enclosed in a dashed-line box. The recognizer R includes a decoder D1 having an input connected to the identification bus IDEN. The decoder D1 has respective outputs for identified directions of transfer involving identified ones of its associated registers. One output of decoder D1 is connected to the set input of a flip-flop AI for controlling a transfer from the information bus INFO to the operand A register OPA. Another output of decoder D1 is connected to the set input of a flip-flop AO to control the transfer of information from the operand A register OPA to the information bus INFO. A third output of decoder D1 is connected to the set input of a flip-flop CI to control the transfer of a command from the information bus INFO to the command register CR.

The operation of the register-direction recognizer R in FIG. 3 in transferring an operand from the information bus INFO to the operand A register OPA will now be described. First, a register-direction identification signal appearing on the identification bus IDEN is supplied to and decoded by the decoder D1 which generates an output that sets the flip-flop AI. Subsequently, the operand information is made available on the information bus INFO and is directed through gate 25 (which is enabled from flip-flop AI) to the operand A register OPA. The operand information passing through gate 25 causes a reply signal that is directed through enabled gate 26 to the reply bus RPLY and to the reset input of flip-flop AI. Transfers from the operand A register OPA and transfers to the command register CR are accomplished in a similar manner.

The local processor LP is shown in FIG. 3 enclosed in a dashed-line box. The local processor LP includes a decoder D2 which responds to the contents of the command register CR to provide outputs selectively enabling corresponding ones of the gates in the local processor LP. The enabling of gate 28 accomplishes a transfer from the local information bus LIB to the operand A register OPA. The output 29 from the decoder D2 causes a clearing of the operand register OPA. The enabling of gate 30 causes a transfer of the contents of register OPA to the local information bus LIB. The enabling of gate 31 accomplishes a transfer of the complement of contents of the register OPA to the local information bus LIB. The gate 32 is enabled by a signal over the local control bus LCB from the arithmetic local processor ALP. When gate 32 is enabled, an elementary command supplied by the arithmetic local processor ALP to the local information bus LIB can pass to the command register CR.

A review will now be made of the architectural construction of the computer system illustrated in FIGS. 1 through 3. The computer system includes a plurality of units necessary for performing the functions inherent in a general-purpose, stored-program computer. The units shown include a master control unit MCU, an address manipulation unit AMU, a memory unit MU, an arithmetic unit AU and an input-output unit IOU. The listed units are connected with each other solely through system buses including an identification bus IDEN, an information bus INFO and a reply bus RPLY.

The identification bus IDEN consists of a sufficient number of conductors to carry coded signals identifying all the register-direction combinations in the system. The illustrated system has thirty-two such register-direction possibilities, and therefore, five conductors are needed in the identification bus IDEN. The five conductors of the identification bus IDEN may be contrasted with the thirty-two wires that might be needed in a conventionally-constructed computer to transfer gate-enabling signals from a centrally located processor to register gates throughout the computer system.

The price paid in the present computer system for this reduction in the number of enabling signal conductors is the provision of a register-direction recognizer R near each register in the computer. This is a small price to pay when the computer is fabricated of integrated circuit arrays.

The system buses include an information bus INFO consisting of a sufficient number of conductors (such as 16) to convey, in parallel, the information bits of an instruction word, or a command word, or a memory address, or a data word, or appropriate portions or combinations of the listed words. All transfers of the contents of a register in one unit to a register in another unit take place over the information bus INFO under the control of register-direction signals previously or concurrently available on the identification bus IDEN. All information transfers are handled in a similar manner regardless of whether the information transferred is an instruction, a command, an address or a data word. This feature of the system architecture contributes to keeping down the number of connections needed between the system bus and each unit of the system.

Each of the five units in the computer system of FIG. 1 includes at least one command register CR and at least one associated local processor LP operative in accordance with the contents of the associated command register CR to manipulate the contents of other registers in the respective unit. The other registers include status registers, instruction registers, address registers and various data registers. The illustarted system architecture in which local processors LP are distributed throughout the computer system and located immediately adjacent to the registers which they control is to be contrasted with the conventional computer system organization in which a single central processor is connected through many conductors to information control points distributed throughout the computer.

In the system of FIG. 1, each of the five units is constructed of a very large number of elemental circuits or gates. In addition to the information transfer gates shown, each register consists of many flip-flops, and each flip-flop is constituted of cross-coupled gates. A relatively small computer designed according to the teachings of this invention, and having an information bus INFO of sixteen conductors for sixteen-bit words, requires about 300 gates in each of the four units MCU, AMU, MU and IOU. Each of these four units of about 300 gates requires fewer than about 30 wires connected between each unit and the system buses. Therefore, each of the four units is geometrically feasible of fabrication in the form of a single integrated circuit array including 300 gates, necessary interconnections, and less than 100 peripheral terminals for connection with the system buses.

However, the present state of development of the art of constructing integrated circuit arrays has not yet reached the point at which 300 good and operable gates can be constructed as a single integrated circuit array under factory production conditions. Therefore, the four listed main units in the system of FIG. 1 are shown as each divided into two units with the partitions represented by dashed lines. For example, the address manipulation unit AMU is divided into a first part including an instruction address register IAR and a second part including an operand address register OAR and a local status register LSR. These parts are individually connected to the system buses under the control of a respective register-direction recognizer R, and each part has a respective local processor for accomplishing manipulations of the contents of associated nearby registers.

A few connections may be necessary or desirable between the two parts of the unit AMU as illustrated by the line 11' connected between the two local processors LP designated 11 and 12. Each of the two parts of the AMU may include about 150 gates and each may require about from thirty to fifty conductors connecting it with the system buses and a smaller number at 11' connecting the two parts.

The two partitioned parts of the memory unit MU also require local interconnections 13' in addition to connections via the main buses. The memory storage MS in the example computer has storage space for 4096 words of 16 bits each. The local interconnections 13' between partitioned parts number about five and the local connections between each partitioned part and the memory storage device MS number about thirty-two. Therefore, each of the two partitioned parts may have about thirty terminals for connection with the system buses IDEN, INFO and RPLY, and have about forty terminals for connection with each other and with the memory storage MS. The total number, sixty, of terminals in each partitioned part is conveniently less than the practical number, 100 to 120, of terminals on the periphery of an integrated circuit array. Each of the two partitioned parts of the input-output unit IOU requires fewer than the total of sixty terminals involved in the partitioned parts of the memory unit MU. The wired instruction fetch means IFU includes matrix and sequencing logic which inherently possesses a sufficiently low terminal-to-gate ratio for fabrication as a large integrated circuit array.

It is therefore seen that the system architecture of the invention is adaptable to being fabricated using integrated circuit arrays of various sizes. That is, the designer will normally use integrated circuit arrays of as large a size (containing as many gates) as is available for production purposes. However, if the available arrays cannot be made to have as many gates as are needed to constitute a complete unit, the unit may be partitioned into a plurality of smaller arrays that are designed to be partially autonomous in operation. Each such smaller array will have a sufficient number of terminals, say 100, for connection with the system buses and with each other. Such a use of smaller arrays is possible, that is, the fewer gates included on the smaller array require no more than the practically available number of terminals, because, according to the invention, each partitioned part of the computer fabricated as an integrated circuit array includes a local register-direction recognizer, a command register and a local processor. Each array including over 50 gates has a gate-to-terminal ratio of at least two-to-one.

The arithmetic unit AU shown as a box in FIG. 1, and shown in greater detail in FIGS. 2 and 3, is required to include about 1200 gates in the above-mentioned, relatively simple computer design. Since 1200 gates is too large a number of gates to expect in a single integrated circuit array in the present state of the manufacturing art, the arithmetic unit AU is shown in FIG. 2 as divided by dashed lines into four parts each intended to be constituted on a single integrated circuit array. It is seen that each partitioned part contains an information register, a command register CR, a register-direction recognizer R for enabling information transfer gates, and a local processor LP suitable for manipulating the contents of the information register and transferring information between the information register and the local information bus LIB. In this way, each partitioned part of the arithmetic unit can be fabricated on a respective integrated circuit array having a sufficiently large number of gates, together with a sufficiently small number of terminals for connections with system buses and local buses.

The functional operation of the computer system illustrated in FIG. 1 is similar to that of conventional, known, general-purpose computers. The operation of the system of FIG. 1 is different from the operation of conventional computers to the extent that the system architecture differs from the architecture of conventional computers. The operation of the system of FIG. 1 can be briefly described as follows. The wired instruction fetch means IFM initially issues register-direction signals and command signals to accomplish the transfer of a first instruction from the memory unit MU to the instruction register IR in the master control unit MCU. The master processor MP interprets the instruction in the instruction register IR and issues register-direction identification signals to the identification signals to the identification bus IDEN for the purpose of establishing a path for the transfer of the contents of one identified register to another identified register. The information transferred from register to register may be address, data, status or command information. Many such transfers may be needed to effect the execution of an instruction. The master processor MP also issues commands over the information bus INFO to a command register CR specified by a register-direction signal supplied to identification bus IDEN. After the master control unit MCU has completed executing an instruction, the instruction address register IAR is incremented or modified, and then the instruction fetch means IFM fetches the next instruction.

The accomplishment of an information transfer, or the execution of a command by a unit, is signaled back to the master control unit MCU, or to the instruction fetch means IFM, over the reply bus RPLY. The use of reply signals is illustrated as an example of a computer system intended to operate asynchronously. It will be understood by those skilled in the art that the invention can be equally well practiced in a computer system provided with fixed timing means for operation in a synchronous manner.

It will also be understood that while one memory unit MU, for example, is shown, the described system architecture is adapted for the addition of other similar substantially-autonomous memory unit modules. Likewise, other units of the system can be enlarged by the modular addition of similar units connected to the system buses. The concept of using the described system buses and connecting substantially autonomous integrated circuit array units to the buses permits the construction of a whole family of easily enlargeable or contractable computers according to the changing needs of the user.

What is claimed is:

1. A computer system including a system bus, memory address and data registers, instruction address and operand address registers, arithmetic operand and accumulator registers, input-output registers, an instruction register, and master control means to generate signals to effect a transfer of the contents of the instruction address register to the memory address register, the accessing and transfer of the addressed instruction to the instruction register, and the generation of signals determined by the contents of the instruction register, wherein the improvement comprises: a construction of said system bus to include an information bus and a register-direction identification bus, a construction of said master control means to generate register-direction signals and apply them to said identification bus, and to generate command signals and apply them to said information bus, and a construction of said computer system of partitioned parts each including: (1) at least one register, (2) gates connected between the registers in the partitioned part and the information bus, (3) a recognizer in the partitioned part connected to receive register-direction signals from said identification bus and having an output connected selectively to enable said gates in the partitioned part, and (4) a local processor in the partitioned part having an input responsive to the contents of a register in the partitioned part and having an output operative to manipulate the contents of a register in the partitioned part.

2. A computer system as defined in claim 1 wherein each of said partitioned parts includes a command register having its output coupled to said local processor in the respective partitioned part.

3. A computer system as defined in claim 1 wherein each of said partitioned parts is constructed of a large integrated circuit array.

4. A computer system as defined in claim 2 wherein each of said partitioned parts is constructed of a large integrated circuit array.

5. A computer system as defined in claim 3 wherein each of said large integrated circuit arrays has a gate-to-terminal ratio of at least two-to-one.

6. A computer system as defined in claim 4 wherein each of said large integrated circuit arrays has a gate-to-terminal ratio of at least two-to-one.

7. A computer system as defined in claim 1 wherein said partitioned parts of the computer system are units and include a memory unit, an arithmetic unit, an input-output unit and a master control unit.

8. A computer system as defined in claim 7 wherein said partioned part units include also an address manipulation unit.

9. A computer system as defined in claim 8 wherein each of said partitioned part units is a large integrated circuit array.

10. A computer system as defined in claim 9 wherein each of said arrays has a gate-to-terminal ratio of at least two-to-one.

11. A computer system as defined in claim 1 wherein each partitioned part of the computer system also includes a local status register.

12. A computer system as defined in claim 1 wherein said system bus is constructed to also include a reply bus coupled to said master control means and said recognizers.

13. A computer system comprising
an information bus and a register-direction identification bus,
a memory unit including address, data, command, and local status registers,
an address manipulation unit including instruction address, operand address, command, and local status registers,
an arithmetic unit including operand, accumulator, command, and local status registers,
an input-output unit including input-output, command, and local status registers, and
a master control unit including instruction, command, and master status registers,
each of said units of the computer system being fabricated of integrated circuit arrays having terminals for connection with said buses,
each of said units including: a plurality of gates connected between said respective listed registers and the information bus, a recognizer having an input connected to receive register-direction signals from said identification bus and having an output connected selectively to enable said gates, and a local processor having an input responsive to the contents of the respective command register and having an output operative to manipulate the contents of others of the registers in the respective unit,
said master control unit additionally including a master processor operative in response to the local processor and to the contents of the instruction and master status registers to generate and transfer register-direction signals and commands to said identification and information buses.

14. A computer system as defined in claim 13 and in addition, a wired instruction fetch means operative to generate and transfer register-direction signals and commands to said identification and information buses to effect an incrementing and transfer of the contents of the instruction address register in the address manipulation unit to the memory address register in the memory unit, and the accessing and transfer of the address instruction to the instruction register in the master control unit.

15. A computer system comprising:
a register-direction identification bus, an information bus, a master control unit, a memory unit, an arithmetic unit, and an input-output unit,
each of said units of the computer system being fabricated of integrated circuit arrays having terminals for connection with said buses,
each of said arrays including at least one register comprised of a plurality of flip-flops for storage of respective information bits, a plurality of gates connected between the information bit storage flip-flops and the information bus, a recognizer having an input connected to receive register-direction signals from said identification bus and having an output connected to enable said gates, a local processor having an input responsive to the contents of at least one of said information bit storage flip-flops and having an output operative to manipulate the contents of at least one of said information bit storage flip-flops, and
means additionally included in said master control unit to generate and transfer register-direction signals to said identification bus and to generate and transfer command information signals to said information bus.

16. A computer system as defined in claim 15 which includes an address manipulation unit in addition to said listed units.

17. A computer system as defined in claim 15 in which said flip-flops consist of cross-coupled gates, and in which each of said arrays which includes more than fifty gates has a gate-to-terminal ratio of more than two-to-one.

References Cited

UNITED STATES PATENTS

| | | | |
|---|---|---|---|
| 3,302,182 | 1/1967 | Lynch et al. | 340—172.5 |
| 3,349,375 | 10/1967 | Seeber et al. | 340—172.5 |

OTHER REFERENCES

IBM Technical Disclosure Bulletin, vol. 7, No. 10, pp. 919–922, March 1965, W. F. Hollobaugh and C. J. Tunis.

RAULFE B. ZACHE, Primary Examiner

PO-1050
(5/69)

UNITED STATES PATENT OFFICE
CERTIFICATE OF CORRECTION

Patent No. 3,462,742 Dated August 19, 1969

Inventor(s) Henry S. Miiller and Robert J. Linhardt

It is certified that error appears in the above-identified patent and that said Letters Patent are hereby corrected as shown below:

Column 1 line 5 change "Miller" to ---Miiller---.
Column 1 line 45 change "path" to ---paths---.
Column 3 line 5 after "control" insert ---of---.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents